US012190670B2

(12) United States Patent
Kuroda et al.

(10) Patent No.: US 12,190,670 B2
(45) Date of Patent: Jan. 7, 2025

(54) MONEY HANDLING APPARATUS AND MONEY HANDLING METHOD

(71) Applicant: Glory Ltd., Hyogo (JP)

(72) Inventors: Toshiyuki Kuroda, Himeji (JP); Tomohiro Kimura, Himeji (JP); Hisashi Ishitobi, Himeji (JP)

(73) Assignee: GLORY LTD., Hyogo (JP)

( * ) Notice: Subject to any disclaimer, the term of this patent is extended or adjusted under 35 U.S.C. 154(b) by 4 days.

(21) Appl. No.: 17/942,177

(22) Filed: Sep. 12, 2022

(65) Prior Publication Data

US 2023/0005319 A1 Jan. 5, 2023

Related U.S. Application Data

(63) Continuation of application No. 16/334,575, filed as application No. PCT/JP2017/028833 on Aug. 7, 2017, now Pat. No. 11,482,065.

(30) Foreign Application Priority Data

Sep. 20, 2016 (JP) ................................ 2016-182764

(51) Int. Cl.
*G07D 11/24* (2019.01)
*G07D 11/14* (2019.01)
(Continued)

(52) U.S. Cl.
CPC ............. *G07D 11/24* (2019.01); *G07D 11/14* (2019.01); *G07D 11/50* (2019.01); *G07F 19/202* (2013.01);
(Continued)

(58) Field of Classification Search
CPC .. G07D 11/00; G07D 11/009; G07D 11/0096; G07D 11/10; G07D 11/12;
(Continued)

(56) References Cited

U.S. PATENT DOCUMENTS 8,276,901 B2 * 10/2012 Taniguchi .............. G07D 11/14 270/47
2009/0183967 A1 * 7/2009 Hamasaki ............. G07F 19/202 194/215
(Continued)

FOREIGN PATENT DOCUMENTS

EP 2763108 A1 8/2014
JP 4481061 B2 6/2010
(Continued)

OTHER PUBLICATIONS

International Search Report and Written Opinion of International Searching Authority in International Patent Application No. PCT/JP2017/028833, dated Oct. 31, 2017.
(Continued)

*Primary Examiner* — Sonji N Johnson
*Assistant Examiner* — April A Taylor
(74) *Attorney, Agent, or Firm* — XSENSUS LLP

(57) ABSTRACT

A money handling apparatus (for example, a banknote handling apparatus) includes a destination selector configured to select a storage unit where at least one of a counterfeit money and suspect money among the money transported by the transporting unit is to be transported, from the plurality of storage units (for example, each banknote storage unit, each storage/feeding unit, collecting unit, banknote ejecting unit, and the like) and a controller configured to control the transporting unit to transport at least one of the counterfeit money and suspect money to the storage unit selected by the destination selector among the plurality of storage units.

16 Claims, 3 Drawing Sheets

(51) Int. Cl.

| | |
|---|---|
| ***G07D 11/50*** | (2019.01) |
| ***G07F 19/00*** | (2006.01) |
| ***G07G 1/00*** | (2006.01) |
| *G07D 9/00* | (2006.01) |

(52) U.S. Cl.
CPC ......... *G07F 19/203* (2013.01); *G07G 1/0018* (2013.01); *G07D 9/00* (2013.01); *G07D 2207/00* (2013.01); *G07D 2211/00* (2013.01)

(58) Field of Classification Search
CPC ...... G07D 11/13; G07D 11/16; G07D 11/184; G07D 11/50; G07D 13/00; G07D 2211/00; G07F 19/202; G07F 19/203
See application file for complete search history.

(56) References Cited

U.S. PATENT DOCUMENTS

| | | | | |
|---|---|---|---|---|
| 2012/0326384 | A1* | 12/2012 | Arikata .................. | G07D 11/12 271/184 |
| 2013/0001041 | A1* | 1/2013 | Doi ........................ | G07D 9/008 453/1 |
| 2013/0047869 | A1 | 2/2013 | Kataoka et al. | |
| 2013/0256091 | A1* | 10/2013 | Kagoshima .......... | B65H 29/006 194/206 |
| 2013/0261789 | A1 | 10/2013 | Uezono et al. | |
| 2014/0072696 | A1* | 3/2014 | Nomura ............... | G07D 11/125 118/712 |
| 2014/0083814 | A1 | 3/2014 | Nomura et al. | |
| 2015/0021385 | A1 | 1/2015 | Michels et al. | |
| 2016/0343191 | A1 | 11/2016 | Kobayashi | |
| 2016/0350995 | A1* | 12/2016 | Mizuno .................. | G07D 7/003 |
| 2017/0018134 | A1 | 1/2017 | Michels et al. | |
| 2017/0309133 | A1 | 10/2017 | Okamoto et al. | |
| 2019/0147683 | A1* | 5/2019 | Kobayashi ............. | G07D 11/10 235/379 |

FOREIGN PATENT DOCUMENTS

| | | | |
|---|---|---|---|
| JP | 2012-203666 | A | 10/2012 |
| JP | 2013-191083 | A | 9/2013 |
| WO | 2014/170995 | A1 | 10/2014 |

OTHER PUBLICATIONS

Extended European Search Report in related EP application No. 17852717 .2, dated May 18, 2020.

* cited by examiner

MONEY HANDLING APPARATUS AND MONEY HANDLING METHOD

CROSS-REFERENCE TO RELATED APPLICATIONS

This application is a continuation of U.S. application Ser. No. 16/334,575 (now U.S. Pat. No. 11,482,065, filed Mar. 19, 2019, which is the National stage of International Application No. PCT/JP2017/028833 filed on Aug. 7, 2017, claiming priority based on Japanese Priority Application No. 2016-182764 filed on Sep. 20, 2016, the entire contents of which are hereby incorporated herein by reference.

TECHNICAL FIELD

The present invention relates to a money handling apparatus and a money handling method for handling money such as banknotes and coins.

BACKGROUND ART

Various types of money handling apparatuses for handling money such as banknotes and coins have been known. For example, Japanese Patent No. 4481061 (JP4481061B) discloses a banknote handling apparatus for performing deposit and dispense processing of banknotes. In such a banknote handling apparatus, the banknotes are stored such that the banknotes are wound on a drum together with a tape and fed out from the drum by sending out the tape from the drum.

SUMMARY OF THE INVENTION

In a conventional banknote handling apparatus as disclosed in Japanese Patent No. 4481061 and the like, a capture bin is provided inside a lower assembly. When processing of banknotes is performed, a banknote judged as a counterfeit note based on a recognition result by a recognition unit is sent to the capture bin and stored in this capture bin. However, in such a conventional banknote handling apparatus, since only one capture bin is provided and there is only one place where the counterfeit note is to be transported, there was a problem that flexible processing of banknotes according to the operation form can not be achieved. Further, in the above banknote handling apparatus, when dispense processing of banknotes is performed, a banknote judged as abnormal transportation based on the recognition result by the recognition unit is also sent to the capture bin as a dispense reject banknote. In this case, the banknotes stored in the capture bin must be sorted into the counterfeit note and the dispense reject banknote by hand, which is troublesome for the operator.

The present invention is made in view of such a matter, and an object of the present invention is to provide a money handling apparatus and money handling method which can perform flexible processing of banknotes according to the operation form compared with the case where there is only one storage unit for storing a counterfeit money or suspect money sent from the transporting unit.

A money handling apparatus of the present invention comprises: a transporting unit configured to transport money; a plurality of storage units, each being connected to different places of the transporting unit and configured to store money transported from the transporting unit, at least one of the storage units being configured such that the stored money is not exposed to the outside; a destination selector configured to select a storage unit, where at least one of a counterfeit money and suspect money among the money transported by the transporting unit is to be transported, from the plurality of storage units; and a controller configured to control the transporting unit to transport at least one of the counterfeit money and suspect money to the storage unit selected by the destination selector among the plurality of storage units.

In the money handling apparatus of the present invention, all the storage units may be configured such that the stored money is not exposed to the outside.

In the money handling apparatus of the present invention, the storage unit configured such that the stored money is not exposed to the outside, among the plurality of storage units, may include a storage/feeding unit configured to store money and feed out the stored money to the transporting unit.

In this case, the storage/feeding unit may include a plurality of rotating members, money is wound by a strip-shaped storage member onto each rotating member, and lengths of the strip-shaped storage members of at least two of the rotating members are different from each other, and at least one of the counterfeit money and suspect money may be wound on the rotating member provided with the smallest length of the strip-shaped storage member among the plurality of rotating members in the storage/feeding unit.

In the money handling apparatus of the present invention, at least one storage unit among the plurality of storage units may include a money ejecting unit configured to eject the money sent from the transporting unit to the outside of the money handling apparatus and configured such that the stored money is exposed to the outside.

In this case, the money ejecting unit may be provided with an opening and closing member and the money ejecting unit is capable of being accessed from the outside of the money handling apparatus when an opening of the money ejecting unit is opened by the opening and closing member.

Further, when the money to be ejected to the outside of the money handling apparatus is transported to the money ejecting unit, the opening of the money ejecting unit may be opened by the opening and closing member, and when at least one of the counterfeit money and suspect money is transported to the money ejecting unit, the opening of the money ejecting unit may be closed by the opening and closing member.

In addition, when at least one of the counterfeit money and suspect money is transported to the money ejecting unit, after the opening of the money ejecting unit is closed by the opening and closing member, if a command to open the opening of the money ejecting unit by the opening and closing member is given, the opening of the money ejecting unit may be opened by the opening and closing member so that the money ejecting unit is capable of being accessed from the outside of the money handling apparatus.

The money handling apparatus of the present invention may further include a notifying unit configured to inform a fact in which at least one of the counterfeit money and suspect money is transported to the money ejecting unit.

In the money handling apparatus of the present invention, the plurality of storage units may comprise three or more storage units and at least two of the storage units are configured such that the stored money is not exposed to the outside and the other storage unit includes the money ejecting unit.

The money handling apparatus of the present invention may further comprises: an upper assembly including an inlet unit configured to take in the money into the money handling apparatus and a recognition unit configured to recognize the money taken in into the money handling apparatus by the inlet unit; and a lower assembly configured to be capable of being accessed internally only when an operator has a certain authority, and at least one storage unit among the plurality of storage units may be provided inside the lower assembly.

In the money handling apparatus of the present invention, the controller may control the transporting unit such that a reject money other than the counterfeit money and suspect money among the money transported by the transporting unit is transported to the storage unit other than the storage unit selected by the destination selector among the plurality of storage units.

The money handling apparatus of the present invention may further comprises an input unit configured to input information on the storage unit where at least one of the counterfeit money and suspect money among the money transported by the transporting unit is to be transported, and the destination selector may select the storage unit, where at least one of the counterfeit money and suspect money among the money transported by the transporting unit is to be transported, from the plurality of storage units based on the information inputted by the input unit.

Alternatively, the money handling apparatus of the present invention may further comprises a communication unit for transmitting and receiving a signal to and from an external device, and the destination selector may select the storage unit, where at least one of the counterfeit money and suspect money, among the money transported by the transporting unit is to be transported, from the plurality of storage units based on the information received from the external device via the communication unit.

A money handling method of the present invention, conducted by a money handling apparatus including a transporting unit configured to transport money and a plurality of storage units, each being connected to different places of the transporting unit and configured to store money transported from the transporting unit, at least one of the storage units being configured such that the stored money is not exposed to the outside, comprises: selecting a storage unit, where at least one of a counterfeit money and suspect money among the money transported by the transporting unit is to be transported, from the plurality of storage units in advance, transporting at least one of the counterfeit money and suspect money to the selected storage unit among the plurality of storage units.

DESCRIPTION OF THE PREFERRED EMBODIMENTS

Figure 1:
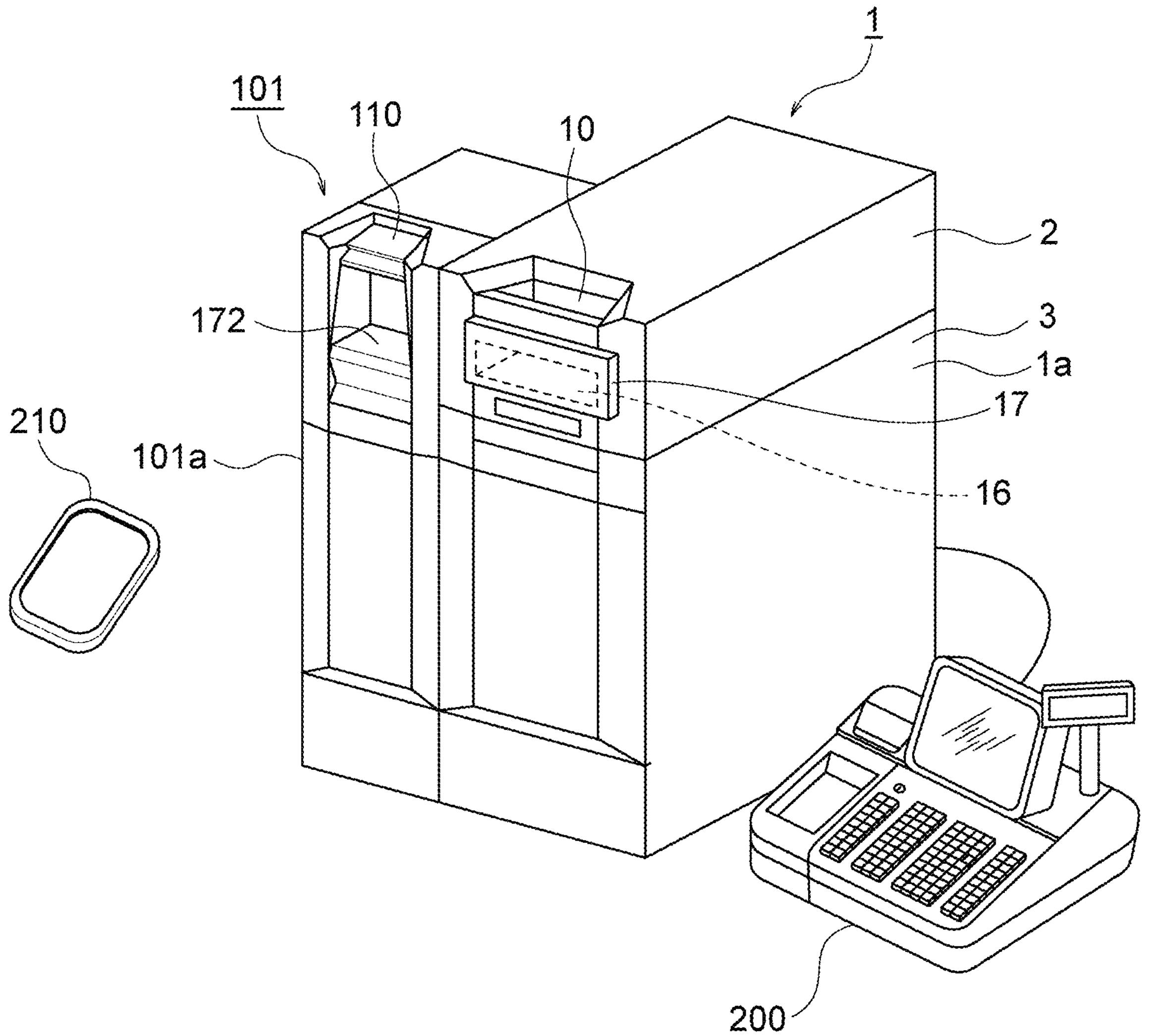
FIG. 1 is a perspective view showing an appearance of a money handling system according to an embodiment of the present invention.
Figure 2:
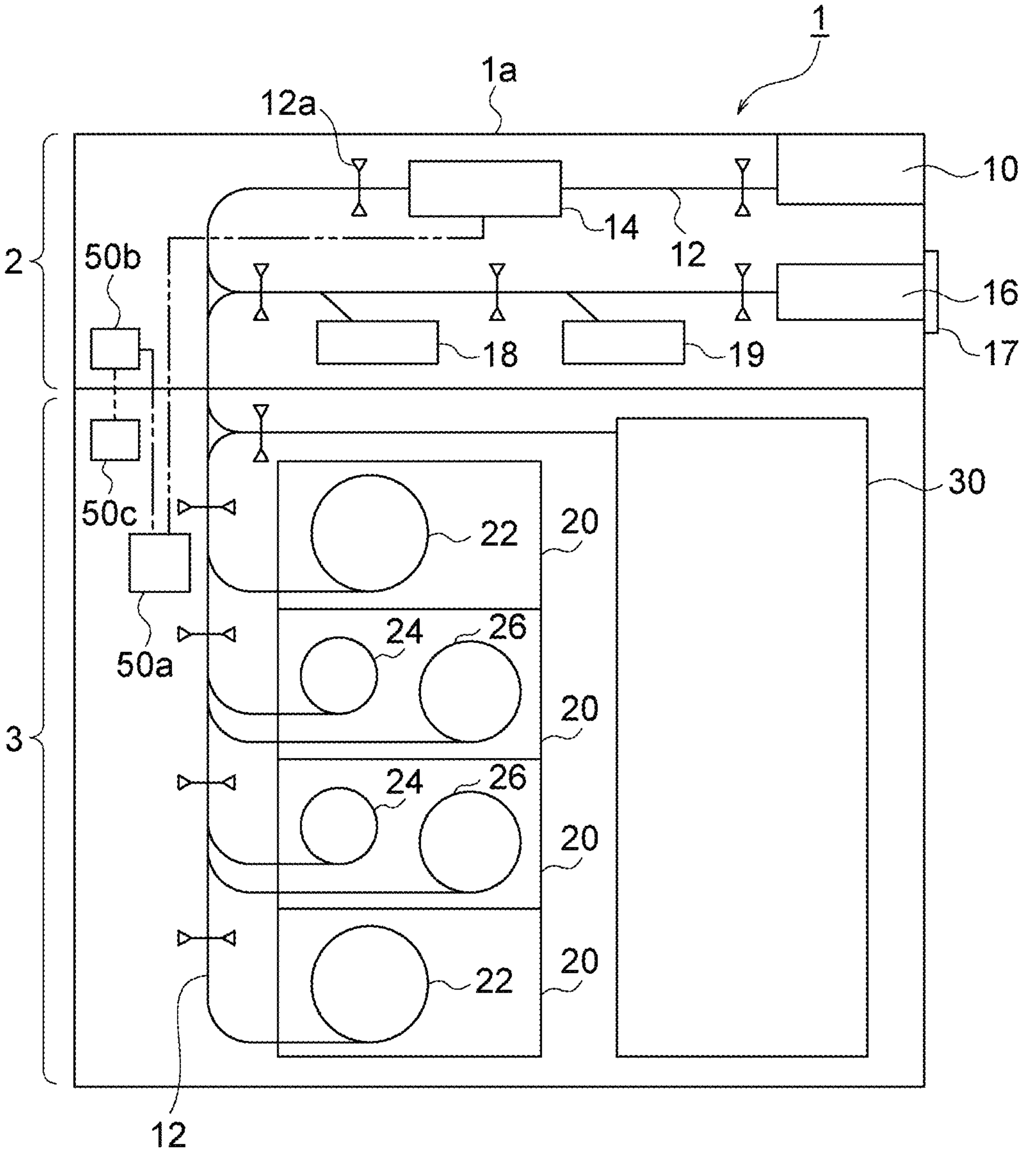
FIG. 2 is a side view showing an internal configuration of a banknote handling apparatus in the money handling system shown in FIG. 1.
Figure 3:
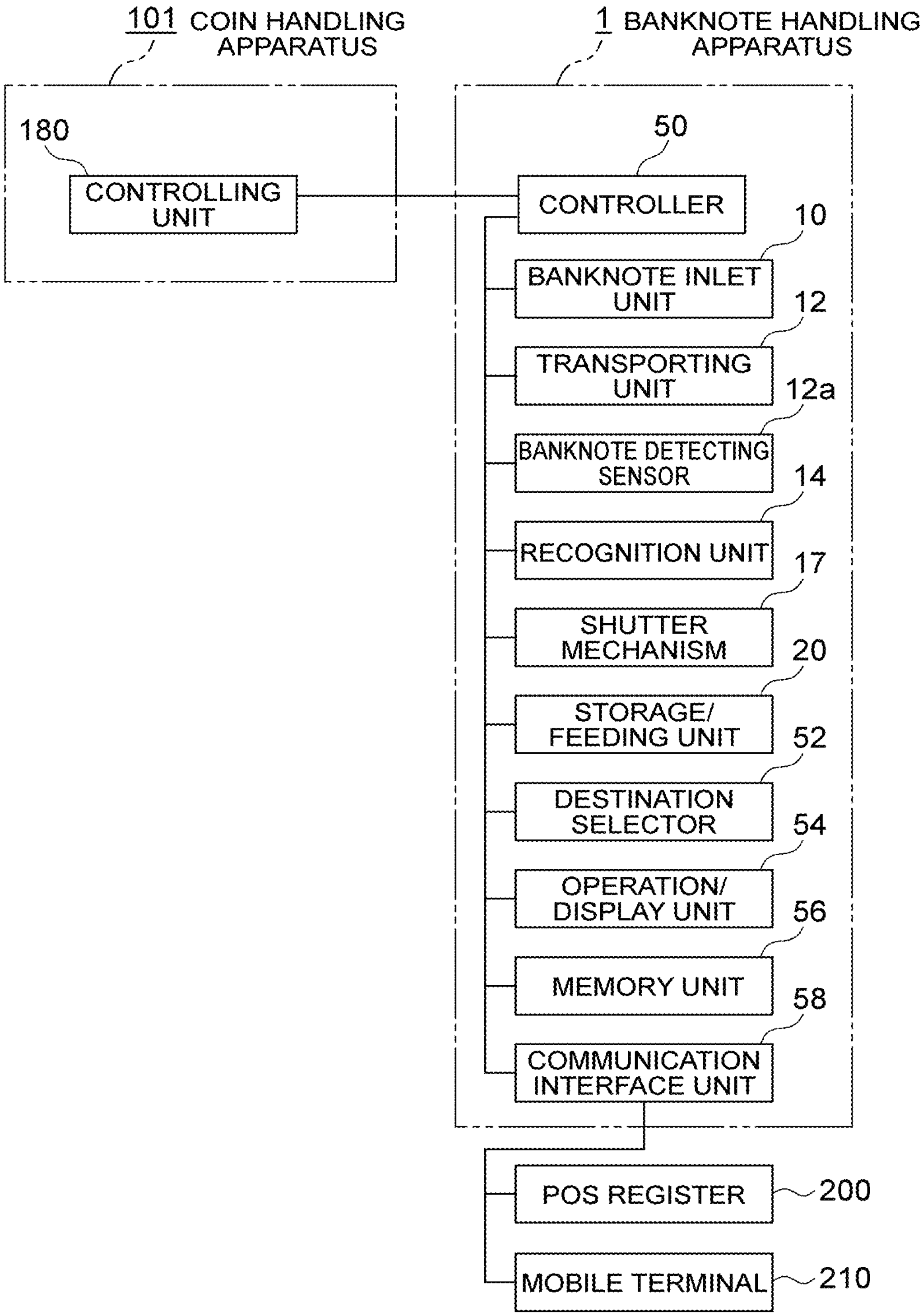
FIG. 3 is a functional block diagram showing a configuration of a control system of the money handling system shown in FIG. 1.

An embodiment of the present invention will be described below with reference to the drawings. FIGS. 1 to 3 are diagrams showing a money handling system according to the present embodiment. Among them, FIG. 1 is a perspective view showing an appearance of the money handling system according to the present embodiment. FIG. 2 is a side view showing an internal configuration of a banknote handling apparatus in the money handling system shown in FIG. 1. FIG. 3 is a functional block diagram showing a configuration of a control system of the money handling system shown in FIG. 1.

The money handling system according to the present embodiment is located in stores such as supermarkets and convenience stores. The money handling system performs deposit processing of banknotes and coins as proceeds from sales and dispense processing of banknotes and coins as change. As shown in FIG. 1, the money handling system according to the present embodiment comprises a banknote handling apparatus 1 and a coin handling apparatus 101 arranged side by side. In addition, a POS register 200 is connected to the banknote handling apparatus 1 so as to be communicable via a LAN or the like. The POS register 200 is used as a management apparatus for managing the banknote handling apparatus 1 and coin handling apparatus 101. In addition, a settlement table (table or counter) is placed at a settlement area in the store, and the settlement table divides the settlement area into a clerk side and a customer side. The clerk waits on one side of the settlement table. In many cases, the POS register 200 is arranged on the side on which the clerk waits so that the clerk can operate it. On the other hand, the customer stands on the other side of the settlement table and places products the customer wishes to purchase on the settlement table. Then, the clerk registers the number and price of each product placed on the settlement table in the POS register 200. Also, the clerk receives money from the customer and puts it into the money handling system. Details of such a money handling system will be described below.

First, the configuration of the banknote handling apparatus 1 will be described in detail with reference to FIG. 2. A side surface on a right side of a housing 1*a* (described later) in FIG. 2 is a front side of the banknote handling apparatus 1 (that is, the front side when the banknote handling apparatus 1 is seen from front as shown in FIG. 1). A left direction in FIG. 2 is a depth direction of the housing 1*a*.

As shown in FIG. 2, the banknote handling apparatus 1 has the substantially rectangular parallelepiped housing 1*a*. In addition, the banknote handling apparatus 1 has an upper assembly 2 and a lower assembly 3. In the upper assembly 2, a banknote inlet unit 10, a transporting unit (or transporter) 12, a recognition unit (or recognizer) 14, and a banknote ejecting unit 16 are provided, respectively. The banknote inlet unit 10 is configured to insert banknotes from the outside to the inside of the housing 1*a*. The transporting unit 12 transports the banknotes inserted into the housing 1*a* by the banknote inlet unit 10. The recognition unit 14 is disposed at the transporting unit 12 and recognizes each banknote being transported by the transporting unit 12. The banknote ejecting unit 16 is configured to eject banknotes from the inside to the outside of the housing 1*a*.

The banknote inlet unit 10 is provided with a plurality of rollers such as a feed roller and kicker roller. The lowermost banknote among the banknotes placed in the banknote inlet unit 10 in a stacked manner by the operator is kicked out one by one by the kicker roller toward the feed roller. This kicked banknote is fed one by one into the housing 1*a* by the feed roller. The banknotes fed into the housing 1*a* by the banknote inlet unit 10 are transported one by one by the transporting unit 12. In addition, the recognition unit 14 recognizes denomination, authentication, fitness, new/old, face/back, transportation status, and the like of each banknote being transported by the transporting unit 12. Each banknote recognized by the recognition unit 14 is sent by the transporting unit 12 to each storage/feeding unit 20 described later for each denomination, for example.

As shown in FIG. 2, banknote detecting sensors 12*a* are provided at various places in the transporting unit 12. Each banknote detecting sensor 12*a* detects the banknote being transported by the transporting unit 12. Each banknote detecting sensor 12*a* is composed of an optical sensor having a light emitting element and light receiving element, and the like. When a light emitted from the light emitting element is obstructed by the banknote being transported by the transporting unit 12 and is not received by the light receiving element, this banknote is detected by the banknote detecting sensor 12*a*. Detection information of each banknote detected by each banknote detecting sensor 12*a* is sent to a controller 50 to be described later. Based on the detection result of each banknote by each banknote detecting sensor 12*a*, it is judged by the controller 50 whether or not an interval between the plurality of banknotes being transported by the transporting unit 12 is a predetermined size. If the controller 50 determines that the interval between the plurality of banknotes being transported by the transporting unit 12 greatly differs from the predetermined size, abnormal transportation, such as skew, linkage, chain, and the like of the banknote that is being transported by the transporting unit 12 is detected.

In the upper assembly 2, two banknote storage units 18, 19 (specifically, capture bins) are connected to the transporting unit 12. In each banknote storage unit 18, 19, the banknotes sent from the transporting unit 12 are stored, respectively. However, the banknotes stored in each banknote storage unit 18, 19 can not be fed out from these banknote storage units 18, 19 to the transporting unit 12. The positions of these banknote storage units 18, 19 are designed so that the banknotes can be sent from the transporting unit 12 to each of the banknote storage units 18, 19 in case of both deposit and dispense processing of banknotes. In the present embodiment, one banknote storage unit among the two banknote storage units 18, 19 (for example, the banknote storage unit 19 closer to the banknote ejecting unit 16) is selected as a storage unit, where at least one of a counterfeit note and suspect note (that is, a destination where at least one of a counterfeit note and suspect note is to be transported) is to be transported, by a destination selector 52 to be described later. Also, when dispense processing of banknotes is performed, a banknote that is fed out from each storage/feeding unit 20 to be described later to the transporting unit 12 but can not be ejected to the outside of the housing 1*a* by the banknote ejecting unit 16 (specifically, the banknote of abnormal transportation, for example) is sent from the transporting unit 12 to the other banknote storage unit (for example, the banknote storage unit 18 far from the banknote ejecting unit 16). Details of such technical matters will be described later.

Further, as shown in FIG. 2, the transporting unit 12 is located so as to extend over the upper assembly 2 and lower assembly 3. In the lower assembly 3, a plurality (four in the example shown in FIG. 2) of storage/feeding units 20 are connected to the transporting unit 12. Each storage/feeding unit 20 stores banknotes sent from the transporting unit 12. In addition, the banknotes stored in each storage/feeding unit 20 can be fed out one by one to the transporting unit 12. More specifically, each of the uppermost storage/feeding unit 20 and lowermost storage/feeding unit 20 among the four storage/feeding units 20 has one drum 22. Then, the banknotes sent from the transporting unit 12 are wound on the drum 22 together with a pair of tapes in a state of being sandwiched between the pair of tapes one by one. When the drum 22 rotates in the direction opposite to the winding direction of the tapes, as the tapes are unwound from the drum 22, the banknotes sandwiched between the pair of tapes are fed out one by one to the transporting unit 12. Each of the second and third storage/feeding units 20 from the top among the four storage/feeding units 20 has two drums 24 and 26. The two drums 24 and 26 have different maximum storage capacities of banknotes. In particular, these storage/feeding units 20 have two drums 24, 26 with different lengths of tapes to be wound on the drum 24, 26. The banknotes sent from the transporting unit 12 are wound on each drum 24, 26, with the pair of tapes in such a manner that the banknotes are sandwiched between the pair of tapes one by one. When each drum 24, 26 rotates in the direction opposite to the winding direction of the tapes, as the tapes are unwound from the drum 24, 26, the banknotes sandwiched between the pair of tapes are fed out to the transporting unit 12 one by one. The length of each tape to be wound on the drum 26 is larger than the length of each tape to be wound on the drum 24. Thus, the maximum storage capacity of banknotes in the drum 26 is greater than the maximum storage capacity of banknotes in the drum 24. In the banknote handling apparatus 1 according to the present embodiment, instead of using each storage/feeding unit 20 of tape-reel type as shown in FIG. 2, a storage/feeding unit of stacker type for storing banknotes in a stacked manner may be used.

In the lower assembly 3, the transporting unit 12 is provided with a collecting unit 30. The collecting unit 30 is used for collecting banknotes stored in each storage/feeding unit 20.

More specifically, a banknote storage bag (not shown) for storing banknotes is detachably attached to the collecting unit 30. The banknotes sent from each storage/feeding unit 20 to the collecting unit 30 through the transporting unit 12 are stored in the banknote storage bag. Also, a banknote of denomination not assigned to each storage/feeding unit 20 is stored in the banknote storage bag attached to the collecting unit 30. Further, an overflow banknote that the storage/feeding unit 20 of the corresponding denomination can not store because of a full state is also stored in the banknote storage bag attached to the collecting unit 30. Then, by taking out the banknote storage bag from the collecting unit 30, the banknotes are collected from the banknote handling apparatus 1 with the banknote storage bag in which the banknotes are stored. As the collecting unit 30, instead of the banknote storage bag (not shown) for storing the banknotes that is removably attached, a banknote collection cassette for storing the banknotes that is removably attached may be used. In this case, the banknotes sent from the transporting unit 12 to the collecting unit 30 are stored in the banknote collection cassette. Then, after the banknotes are stored in the banknote collection cassette, by taking out the banknote collection cassette from the banknote handling apparatus 1, the banknotes can be collected from the collecting unit 30 with the banknote collection cassette in which the banknotes are stored.

Also, in the banknote handling apparatus 1 according to the present embodiment, the lower assembly 3 is configured as a safe cabinet of which only an operator having a predetermined authority can access the interior. More specifically, the control competence of the banknotes stored in each storage/feeding unit 20 and collecting unit 30 inside the lower assembly 3 is under a cash in transit company. Then, only the guard of the cash in transit company can access the inside of the lower assembly 3 by opening a door (not shown) of the lower assembly 3. Specifically, a lock mechanism (not shown) for locking the door of the lower assembly 3 in a closed state is provided. The key or password for unlocking the door locked by the locking mechanism is given only to the operator who is allowed to access the inside of the lower assembly 3 (for example, the guard of the cash in transit company). Thus, only the guard of the cash in transit company can collect the banknote storage bag attached to the collecting unit 30 from the inside of the lower assembly 3. That is, the clerk and the like of the store can not access the inside of the lower assembly 3, so that the clerk can not take out the banknotes stored in each storage/feeding unit 20 and collecting unit 30. As a result, it is possible to enhance the anti-theft property of the banknotes stored in each storage/feeding unit 20 and collecting unit 30.

As shown in FIGS. 1 and 2, the banknote ejecting unit 16 is provided with a shutter mechanism 17 for opening and closing a banknote outlet of the banknote ejecting unit 16. As shown in FIGS. 1 and 2, if the banknote outlet of the banknote ejecting unit 16 is closed by the shutter mechanism 17, the operator can not take out the banknotes, sent from the transporting unit 12 to the banknote ejecting unit 16, from the banknote ejecting unit 16 to the outside of the housing 1*a*. On the other hand, when the banknote outlet of the banknote ejecting unit 16 is opened by the shutter mechanism 17, the operator can take out the banknotes, sent from the transporting unit 12 to the banknote ejecting unit 16, from the banknote ejecting unit 16 to the outside of the housing 1*a*. When the banknote handling apparatus 1 is in a standby state, the shutter mechanism 17 closes the banknote outlet of the banknote ejecting unit 16.

In the present embodiment, each banknote storage unit 18, 19, each storage/feeding unit 20, and collecting unit 30 are configured such that the stored banknotes are not exposed to the outside. On the other hand, the banknote ejecting unit 16 is configured such that the stored banknotes can be exposed to the outside.

Next, a detailed configuration of the coin handling apparatus 101 will be briefly described. The coin handling apparatus 101 includes a substantially rectangular parallelepiped housing 101*a*, a coin inlet unit 110, and a coin ejecting unit 172. The coin inlet unit 110 is configured to insert coins from the outside to the inside of the housing 101*a*. The coin ejecting unit 172 is configured to eject coins from the inside to the outside of the housing 101*a*. Inside the housing 101*a*, a recognition unit (not shown) and a plurality of storage/feeding units (not shown) in which coins recognized by the recognition unit are stored for each denomination are provided, respectively. The recognition unit recognizes the coins inserted into the housing 101*a* by the coin inlet unit 110. Coins fed from each storage/feeding unit are ejected from the inside to the outside of the housing 101*a* by the coin ejecting unit 172. A collecting box (not shown) used as an overflow coin storage unit is provided inside the housing 101*a*. The collecting box can be withdrawn to the front side in the horizontal direction with respect to a collecting box accommodating unit (not shown) provided in a lower area of the housing 101*a*. The collecting box stores overflow coins that can not be stored in each storage/feeding unit. Also, coins to be collected that are fed out from each storage/feeding unit are stored in the collecting box. Then, after the coins are stored in the collecting box, the guard and the like of the cash in transit company withdraws the collecting box from the collecting box accommodating unit toward the front side, so that the guard and the like can collect the coins with the collecting box.

Next, a configuration of the control system of the money handling system according to the present embodiment will be described with reference to FIG. 3. As shown in FIG. 3, the controller 50 is provided inside the housing 1*a* of the banknote handling apparatus 1. Each component of the banknote handling apparatus 1 is controlled by the controller 50. More specifically, the controller 50 is connected to each of the banknote inlet unit 10, the transporting unit 12, each banknote detecting sensor 12*a*, the recognition unit 14, the shutter mechanism 17, each storage/feeding unit 20, and the like. A signal related to the recognition result of each banknote by the recognition unit 14 and a signal related to the detection result of each banknote by each banknote detecting sensor 12*a* are sent to the controller 50. The controller 50 controls the components such as the banknote inlet unit 10, the transporting unit 12, the shutter mechanism 17, and each storage/feeding unit 20 by sending command signals to each component. A controller 180 for controlling each component of the coin handling apparatus 101 is provided in the housing 101*a* of the coin handling apparatus 101. The controller 50 provided inside the housing 1*a* of the banknote handling apparatus 1 and the controller 180 provided inside the housing 101*a* of the coin handling apparatus 101 are connected by a signal line. Signals are transmitted between the controller 50 and the controller 180.

As shown in FIG. 3, the destination selector 52, an operation/display unit (or input interface) 54, a memory unit 56, and a communication interface unit 58 are connected to the controller 50. The destination selector 52 selects a storage unit, where at least one of a counterfeit note and suspect note among the banknotes transported by the transporting unit 12 is to be transported, from the two banknote storage units 18, 19. Details of the function of the destination selector 52 will be described later. Further, the operation/display unit 54 is composed of, for example, a touch panel provided on the front surface or upper surface of the housing 1*a*. The processing status of banknotes and coins in the banknote handling apparatus 1 and coin handling apparatus 101 is displayed on the operation/display unit 54. In addition, information such as the amount of banknotes stored in each storage/feeding unit 20 of the banknote handling apparatus 1 and coins stored in each storage/feeding unit of the coin handling apparatus 101 for each denomination are displayed on the operation/display unit 54. Further, the operator can input various commands to the controller 50 of the banknote handling apparatus 1 and the controller 180 of the coin handling apparatus 101 by using the operation/display unit (or input interface) 54. In addition, processing history of banknotes and coins in the banknote handling apparatus 1 and coin handling apparatus 101 is stored in the memory unit 56. Further, information such as the amount of banknotes stored in each storage/feeding unit 20 of the banknote handling apparatus 1 and coins stored in each storage/feeding unit of the coin handling apparatus 101 for each denomination are stored in the memory unit 56. In addition, the controller 50 can transmit and receive a signal to and from an external device (specifically, the POS register 200, for example) provided separately from the banknote handling apparatus 1 and coin handling apparatus 101 via the communication interface unit 58. Also, in the money handling system according to the present embodiment, when a mobile terminal 210 such as mobile phone, smart phone, iPad (registered trademark) and the like can be used, the controller 50 can transmit and receive a signal to and from the mobile terminal 210 via the communication interface unit 58.

As shown in FIG. 2, the controller 50 includes a data processing substrate 50*a* and a lower substrate 50*c* provided inside the lower assembly 3, respectively, and an upper substrate 50*b* provided inside the upper assembly 2. The data processing substrate 50*a* and the upper substrate 50*b* are connected to each other, and the upper substrate 50*b* and the lower substrate 50*c* are connected to each other. The upper substrate 50*b* controls each component provided inside the upper assembly 2 (specifically, the transporting unit 12, the shutter mechanism 17 and the like provided inside the upper assembly 2). On the other hand, the lower substrate 50*c* controls each component provided inside the lower assembly 3 (specifically, the transporting unit 12, each storage/feeding unit 20 and the like provided inside the lower assembly 3). The recognition result of each banknote by the recognition unit 14 is sent to the data processing substrate 50*a*. Also, the communication interface unit 58 is connected to the data processing substrate 50*a*. Various information is sent from the external device such as the POS register 200 and the mobile terminal 210 to the data processing substrate 50*a* via the communication interface unit 58.

Next, an operation of the money handling system according to the present embodiment will be explained. Specifically, the operation relating to deposit and dispense processing of banknotes in the banknote handling apparatus 1 will be described below. Note that the operation of the banknote handling apparatus 1 as described below is performed by the controller 50 controlling each component of the banknote handling apparatus 1.

In the money handling system according to the present embodiment, when deposit processing of banknotes is performed, the storage unit, where the banknote recognized as a counterfeit note or suspect note by the recognition unit 14 is to be transported, is selected from the two banknote storage units 18, 19 in advance by the destination selector 52. Note that the counterfeit note is a banknote which is recognized as clearly not a genuine note (that is, a banknote legitimately issued by a country or regional integrated body consisting of a plurality of countries) by the recognition unit 14, and the suspect note is a banknote which is unclear whether a genuine note or counterfeit note in the recognition result by the recognition unit 14. In some specific country or regional integrated body that issues money, when a counterfeit note or suspect note is found, it is necessary to collect the found counterfeit note or suspect note and send it to the central bank or the like. Also, when dispense processing of banknotes is performed, the banknote that is fed out from each storage/feeding unit 20 to the transporting unit 12 but can not be ejected to the outside of the housing 1*a* by the banknote ejecting unit 16 (more specifically, abnormal transportation banknote) is sent to a banknote storage unit, that is not selected by the destination selector 52 as the storage unit where a counterfeit notes or suspect note is to be transported, of the two banknote storage units 18, 19, as dispense reject banknote.

More specifically, the operator can input information on which of the two banknote storage units 18, 19 is the storage unit, where at least one of a counterfeit note and suspect note is to be transported, by the operation/display unit 54. Based on the information inputted by the operation/display unit 54, the destination selector 52 selects the storage unit, where at least one of a counterfeit note and suspect note among the banknotes being transported by the transporting unit 12 is to be transported, from the two banknote storage units 18, 19. Note that the operator may input the information that one of the two banknote storage units 18, 19 is the storage unit, where both counterfeit note and suspect note are to be transported, by the operation/display unit 54. In this case, the banknote storage unit selected by the destination selector 52 from the two banknote storage units 18, 19 stores both counterfeit note and suspect note. On the other hand, dispense reject banknote is sent to the banknote storage unit not selected by the destination selector 52. Otherwise, the operator may input information that only one of the two banknote storage units 18, 19 is the storage unit, where one type of a counterfeit note and suspect note is to be transported, by the operation/display unit 54. In this case, the banknote storage unit selected by the destination selector 52 stores one of the counterfeit note and suspect note from the two banknote storage units 18, 19. On the other hand, the banknote of the other type of the counterfeit note and suspect note, and the dispense reject banknote are sent to the banknote storage unit not selected by the destination selector 52.

The destination selector 52 is not limited to one that selects the storage unit, where at least one of a counterfeit note and suspect note among the banknotes transported by the transporting unit 12 is to be transported, from the two banknote storage units 18, 19 based on the information inputted by the operation/display unit 54. As another embodiment, information on the storage unit, where at least one of a counterfeit note and suspect note among the banknotes transported by the transporting unit 12 is to be transported, may be transmitted from the external device such as POS register 200 or mobile terminal 210 to the controller 50 via the communication interface unit 58. In this case, the destination selector 52 selects, based on the information received from the external device such as the POS register 200 or the mobile terminal 210 via the communication interface unit 58, the storage unit, where at least one of a counterfeit note and suspect note among the banknotes transported by the transporting unit 12 is to be transported, from the two banknote storage units 18, 19. If information concerning the storage unit, where at least one of a counterfeit note and suspect note among the banknotes transported by the transporting unit 12 is to be transported, is not inputted to the operation/display unit 54, the storage unit, where at least one of the counterfeit note and suspect note is to be transported, may be automatically set to one certain banknote storage unit (specifically, for example, the banknote storage unit 19) by the destination selector 52. In addition, when information on the storage unit, where at least one of a counterfeit note and suspect note among the banknotes transported by the transporting unit 12 is to be transported, is not transmitted from the external device such as the POS register 200 or the mobile terminal 210 to the controller 50 via the communication interface unit 58, the storage unit, where at least one of the counterfeit note and suspect note is to be transported, may be automatically set to one certain banknote storage unit (specifically, for example, the banknote storage unit 19) by the destination selector 52. Also, based on a predetermined condition, the storage unit, where at least one of the counterfeit note and suspect note is to be transported, may be automatically set by the destination selector 52. The predetermined condition is, for example, one of the business style in which the money handling system is used, the store or area in which the money handling system is installed, the type of operator using the money handling system (for example, a general customer or store clerk) or authority of the operator using the money handling system (for example, administrator or general clerk), and the like. Specifically, for example, when the operator using the money handling system is the general customer, the storage unit, where at least one of a counterfeit note and suspect note is to be transported, is set to be the banknote storage unit 19 by the destination selector 52. On the other hand, if the operator using money handling system is the store clerk, the storage unit, where at least one of a counterfeit note and suspect note is to be transported, is set to be the banknote ejecting unit 16 by the destination selector 52.

Next, an operation related to deposit processing of banknotes in the banknote handling apparatus 1 will be described. In the following description, a case where the banknote storage unit 19 among the two banknote storage units 18, 19 is selected by the destination selector 52 as the storage unit, where the banknote recognized as a counterfeit note or suspect note by the recognition unit 14 is to be transported, when deposit processing of banknotes is performed will be described. First, the operator inputs a start command of deposit processing of banknotes by the operation/display unit 54 and puts the banknotes into the banknote inlet unit 10. The banknotes put into the banknote inlet unit 10 is fed out one by one into the housing 1*a* by a plurality of rollers such as the feed roller and kicker roller provided in the banknote inlet unit 10. Then, the fed banknotes are transported by the transporting unit 12. In addition, the denomination, authentication, fitness, new/old, face/back, transportation status, and the like of each banknote transported by the transporting unit 12 are recognized by the recognition unit 14. The banknote judged to be a normal banknote based on the recognition result by the recognition unit 14 is transported from the upper assembly 2 to the lower assembly 3 by the transporting unit 12. Then, the banknote transported from the upper assembly 2 to the lower assembly 3 is stored in each storage/feeding unit 20 provided in the lower assembly 3 for each denomination. On the other hand, the banknote recognized as a counterfeit note or suspect note by the recognition unit 14 is sent to the banknote storage unit 19 by the transporting unit 12 and stored in the banknote storage unit 19. In this manner, the banknotes recognized as both counterfeit note and suspect note by the recognition unit 14 are stored in the banknote storage unit 19. Also, a banknote of a denomination which is not assigned to each storage/feeding unit 20 and an overflow banknote that can not be stored in a corresponding storage/feeding unit 20 because of a full state are sent to the collecting unit 30 by the transporting unit 12. The banknotes sent to the collecting unit 30 are stored in the banknote storage bag attached to the collecting unit 30. Then, when all the banknotes put into the banknote inlet unit 10 are fed out into the housing 1*a* and the fed banknotes are sent to each storage/feeding unit 20, banknote storage unit 19 or collecting unit 30, deposit processing of banknotes in the banknote handling apparatus 1 is completed.

Next, an operation related to dispense processing of banknotes in the banknote handling apparatus 1 will be described. First, the operator inputs the number of banknotes to be dispensed for each denomination, or total monetary amount of banknotes to be dispensed and inputs a start command of dispense processing of banknotes by the operation/display unit 54. Then, banknotes to be dispensed are fed out one by one from each storage/feeding unit 20 to the transporting unit 12. The fed banknotes are transported from the lower assembly 3 to the upper assembly 2 by the transporting unit 12. The banknote judged not to be abnormal transportation based on the detection result by each banknote detecting sensor 12*a* is sent to the banknote ejecting unit 16 and stacked in the banknote ejecting unit 16. If the banknote storage unit 19 among the two banknote storage units 18, 19 is selected by the destination selector 52 as the storage unit, where the banknote recognized as a counterfeit note or suspect note by the recognition unit 14 is to be transported, when deposit processing of banknotes is performed, the banknote judged as abnormal transportation based on the detection result by each banknote detecting sensor 12*a* (that is, dispense reject banknote) is sent to the banknote storage unit 18 that is not selected by the destination selector 52. The banknote sent to the banknote storage unit 18 is stored in this banknote storage unit 18. When all the banknotes to be dispensed are sent to the banknote ejecting unit 16 and stacked in the banknote ejecting unit 16, the banknote outlet of the banknote ejecting unit 16 is opened by the shutter mechanism 17. This allows the operator to take the banknotes out of the housing 1*a* from the banknote ejecting unit 16. In this manner, dispense processing of banknotes in the banknote handling apparatus 1 is completed.

Next, an operation related to collection processing of banknotes in the banknote handling apparatus 1 will be described. First, the guard and the like of the cash in transit company inputs a start command of collection processing of banknotes by the operation/display unit 54. Then, all the banknotes stored in each storage/feeding unit 20 are fed out one by one to the transporting unit 12. All the fed banknotes are sent to the collecting unit 30 by the transporting unit 12. Specifically, a banknote storage bag (not shown) for storing banknotes is detachably attached to the collecting unit 30. The banknotes sent from each storage/feeding unit 20 to the collecting unit 30 by the transporting unit 12 are stored in the banknote storage bag. When all the banknotes are sent from each storage/feeding unit 20 to the collecting unit 30 and stored in the banknote storage bag attached to the collecting unit 30, the guard and the like of the cash in transit company opens the door of the lower assembly 3 to take out the banknote storage bag from the collecting unit 30. In this manner, the banknotes are collected from the banknote handling apparatus 1 together with the banknote storage bag. In this way, when the banknote storage bag in which the banknotes are stored is taken out from the banknote handling apparatus 1, collection process of banknotes in the banknote handling apparatus 1 is completed.

As described above, in the present embodiment, a banknote recognized as a counterfeit note or suspect note by the recognition unit 14 is stored in one banknote storage unit (for example, the banknote storage unit 19) among the two banknote storage units 18, 19 when deposit processing of banknotes is performed. On the other hand, a dispense reject banknote which can not be dispensed to the outside of the housing 1*a* by the banknote ejecting unit 16 due to abnormal transportation and the like is stored in the other banknote storage unit (for example, the banknote storage unit 18) when dispense processing of banknotes is performed. For this reason, compared with the case where only one banknote storage unit is provided and a banknote recognized as a counterfeit note or suspect note by the recognition unit 14 and a dispense reject banknote are stored in the same banknote storage unit, it is possible to perform flexible processing of banknotes according to the operation form. Specifically, if only one banknote storage unit is provided and a banknote recognized as a counterfeit note or suspect note by the recognition unit 14 and a dispense reject banknote are stored in the same banknote storage unit, the following problem may happen. That is, after the banknotes are taken out from the banknote storage unit, the operator must manually sort the banknotes taken out from the banknote storage unit into a counterfeit note, suspect note and dispense reject banknote, and such an operation is laborious for the operator. On the other hand, the banknote handling apparatus 1 according to the present embodiment can prevent such a problem.

In the banknote handling apparatus 1 according to the present embodiment, when deposit processing of banknotes is performed, banknote data of deposit processing of one transaction (specifically, information such as serial number of deposited banknote) is temporarily stored in the upper substrate 50*b* of the controller 50. On the other hand, banknote data related to the banknote that is judged to be a counterfeit note or suspect note by the recognition unit 14 and sent to the banknote storage unit (for example, the banknote storage unit 19) selected by the destination selector 52 (that is, capture data, specifically information on serial number and image data of the counterfeit note or suspect note) is temporarily stored in the recognition unit 14. When all the banknotes are fed out from the banknote inlet unit 10 into the housing 1*a* and sent to each storage/feeding unit 20, banknote storage unit 19 or collecting unit 30, the data processing substrate 50*a* sends a command to the recognition unit 14 and upper substrate 50*b*, respectively. As a result, capture data is sent from the recognition unit 14 to the data processing substrate 50*a*. In addition, banknote data of deposit processing of one transaction is sent from the upper substrate 50*b* to the data processing substrate 50*a*. Then, to the capture data and banknote data of deposit processing of one transaction sent to the data processing substrate 50*a*, information on date and time, identification number of money handling system, transaction number, information on presence/absence of return of banknote and the like are given in the data processing substrate 50*a*. Thereafter, the capture data and banknote data of deposit processing of one transaction to which the information on the date and time and the like is given are sent from the data processing substrate 50*a* to the POS register 200 by the communication interface unit 58. In addition, the clerk of the store asks the customer to obtain information on the customer (for example, the identification number of the customers license, the name, the address, and the like), and enters the obtained information into the POS register 200. As a result, the customers information is stored in the memory unit of the POS register 200. At this time, customer information is linked to capture data and banknote data of deposit processing of one transaction sent to the POS register 200 from the data processing substrate 50*a*. In this way, when collecting a counterfeit note or suspect note and sending it to the central bank and the like, it is possible to track which customer originally have the counterfeit note or suspect note stored in banknote storage unit 19.

In the above description, the mode in which the destination selector 52 selects the storage unit, where a counterfeit note or suspect note among the banknotes transported by the transporting unit 12 is to be transported, from the two banknote storage units 18, 19 has been described. However, in the present embodiment, the destination selector 52 may select the storage unit, where a counterfeit note or suspect note is to be transported, from the component other than the two banknote storage units 18, 19. For example, the destination selector 52 may select the storage unit, where at least one of a counterfeit note and suspect note among the banknotes transported by the transporting unit 12 is to be transported, from two banknote storage units 18, 19, each storage/feeding unit 20 and collecting unit 30. Also, the number of banknote storage units provided in the banknote handling apparatus 1 may be one. In this case, the storage unit, where at least one of a counterfeit note and suspect note among the banknotes transported by the transporting unit 12 is to be transported, may be selected from this one banknote storage unit, each storage/feeding unit 20 and collecting unit 30 by the destination selector 52.

As the storage unit, where at least one of a counterfeit note and suspect note among the banknotes transported by the transporting unit 12 is to be transported, the case where the second or third storage/feeding unit 20 from the top in FIG. 2 is selected by the destination selector 52 will be described. In this case, among the two drums 24, 26 in the storage/feeding unit 20, the drum 24 with a smaller maximum storage capacity of banknotes is assigned as the storage unit where at least one of a counterfeit note and suspect note is to be transported. In this case, the banknote recognized as a normal banknote based on the recognition result by the recognition unit 14, when deposit processing of banknotes is performed, is not send to the drum 24 of the storage/feeding unit 20 selected by the destination selector 52. On the other hand, the banknote recognized as a counterfeit note or suspect note based on the recognition result by the recognition unit 14 is stored in the drum 24 of the storage/feeding unit 20 selected by the destination selector 52. When deposit processing of banknotes is performed, it is considered that the number of banknotes that are recognized as counterfeit notes or suspect notes based on the recognition result by the recognition unit 14 is not large.

Therefore, as the storage unit, where at least one of a counterfeit note and suspect note is to be transported, the drum 24 with a smaller maximum storage capacity of banknotes is assigned among the two drums 24, 26 in the storage/feeding unit 20. This makes it possible to store normal banknotes in the drum 26 with a larger maximum storage capacity of banknotes. Therefore, it is possible to increase the storage amount of the normal banknotes in the entire four storage/feeding units 20.

In the present embodiment, the destination selector 52 may select the banknote ejecting unit 16 as the storage unit where at least one of a counterfeit note and suspect note among the banknotes transported by the transporting unit 12 is to be transported. More specifically, the operator can select and set the storage unit, where a counterfeit note or suspect note is to be transported, from each banknote storage unit 18, 19 and banknote ejecting unit 16 by the operation/display unit 54. If the banknote ejecting unit 16 is selected as the storage unit, where a counterfeit note or suspect note is to be transported, by the operation/display unit 54 by the operator, the banknote judged as a counterfeit note or suspect note based on the recognition result by the recognition unit 14, when deposit processing of banknotes is performed, is sent to the banknote ejecting unit 16 by the transporting unit 12 and stacked in this banknote ejecting unit 16. Further, while deposit processing of banknotes is performed, the banknote outlet of the banknote ejecting unit 16 is closed by the shutter mechanism 17. Therefore, the operator can not take out the counterfeit note or suspect note sent to the banknote ejecting unit 16 to the outside of the housing 1*a*.

Then, when all the banknotes are fed from the banknote inlet unit 10 into the housing 1*a* and sent to each storage/feeding unit 20, banknote ejecting unit 16 or collecting unit 30, if a counterfeit note or suspect note is stacked in the banknote ejecting unit 16, a message indicating that a counterfeit note or suspect note exists in the banknote ejecting unit 16 is displayed on the operation/display unit 54. Further, a screen for selecting whether or not the customer (operator) accepts collection of the counterfeit note or suspect note sent to the banknote ejecting unit 16 is displayed on the operation/display unit 54. Then, when the operator inputs to accept collection of the counterfeit note or suspect note sent to the banknote ejecting unit 16 by the operation/display unit 54, this information is notified to the clerk and the like of the store, and the clerk and the like move to the area beside the banknote handling apparatus 1. Thereafter, the clerk and the like gives a command to the controller 50 to open the banknote outlet closed by the shutter mechanism 17 by the operation/display unit 54 and the banknote outlet is opened by the shutter mechanism 17. After that, if there is a box for collection of a counterfeit note or suspect note near the money handling system, the clerk and the like of the store takes out the counterfeit note or suspect note from the banknote ejecting unit 16 and put it in an envelope. Then, the clerk or the like of the store puts the envelope storing the counterfeit note or suspect note into the box and the like. On the other hand, if there is no box for collection of a counterfeit note or suspect note beside the money handling system, the clerk and the like of the store takes out a counterfeit note or suspect note from the banknote ejecting unit 16. Then, the counterfeit note or suspect note taken out from the banknote ejecting unit 16 is managed separately at the cash register. In this way, the counterfeit note or suspect note is collected at the store, and the collected counterfeit note or suspect note is sent to the central bank and the like. On the other hand, when the operator inputs a command not to accept collection of the counterfeit note or suspect note sent to the banknote ejecting unit 16 by the operation/display unit 54, a command to open the banknote outlet by the shutter mechanism 17 is sent to the controller 50, and the banknote outlet is opened by the shutter mechanism 17. This allows customers to take out the counterfeit note or suspect note from the banknote ejecting unit 16.

According to the banknote handling apparatus 1 of the present embodiment having the above configuration, as the plurality of storage units connected to different places in the transporting unit 12 and storing banknotes sent from the transporting unit 12, at least two (specifically, for example, two banknote storage units 18, 19) selected from the storage units 18, 19, each storage/feeding unit 20, collecting unit 30 and banknote ejecting unit 16 are provided. At least one storage unit is configured such that the stored banknotes are not exposed to the outside. Further, the destination selector 52 for selecting the storage unit, where at least one of a counterfeit note and suspect note among the banknotes transported by the transporting unit 12 is to be transported, from a plurality of storage units is provided. The controller 50 controls the transporting unit 12 to transport at least one of the counterfeit note and suspect note to the storage unit (for example, banknote storage unit 19) selected by the destination selector 52 among the plurality of storage units. In this manner, at least one storage unit, where the counterfeit note and suspect note among the banknotes transported by the transporting unit 12 is to be transported, is selected in advance from the plurality of storage units by the destination selector 52, and at least one of the counterfeit note and suspect note is transported to the storage unit selected by the destination selector 52. This makes it possible to perform flexible processing of banknotes according the operation form as compared with the case where there is only one storage unit capable of storing a counterfeit money or suspect money sent from the transporting unit 12.

Further, in the banknote handling apparatus 1 of the present embodiment, as described above, if the plurality of storage units to be a target selected by the destination selector 52 as the storage unit, where at least one of a counterfeit note and suspect note among the banknotes transported by the transporting unit 12 is to be transported, are at least two storage units selected from each banknote storage unit 18, 19, each storage/feeding unit 20, and collecting unit 30, all the storage units are configured not to be exposed to the outside.

If the storage/feeding unit 20 is included in the plurality of storage units to be the target selected by the destination selector 52, a counterfeit note or suspect note stored in the storage/feeding unit 20 can be fed out from the storage/feeding unit 20 to the transporting unit 12 and sent to the banknote ejecting unit 16, collecting unit 30, and the like.

Further, when the banknote ejecting unit 16 is included in the plurality of storage units to be the storage unit selected by the destination selector 52, when the customer requests that a counterfeit note or suspect note is returned, the counterfeit note or suspect note can be ejected to the outside of the housing 1*a* by the banknote ejecting unit 16. In addition, if at least one of the counterfeit note and suspect note is transported to the banknote ejecting unit 16, when the banknote outlet is closed by the shutter mechanism 17 as the opening and closing member and then a command to open the banknote outlet is given, the banknote opening is opened by the shutter mechanism 17 and it becomes possible to access the banknote ejecting unit 16 from outside the banknote handling apparatus 1. By this way, it is possible to return the counterfeit note or suspect note to the customer, or clerk and the like of the store can take out of the counterfeit note or suspect note from the banknote ejecting unit 16 and put it in the box, cash register, and the like.

In addition, in the banknote handling apparatus 1 of the present embodiment, as described above, if the banknote ejecting unit 16 is included in the plurality of storage units to be the target selected by the destination selector 52 as the storage unit, where at least one of a counterfeit note and suspect note among the banknotes transported by the transporting unit 12 is to be transported, the following operation is conducted. That is, when at least one of the counterfeit note and suspect note is transported to the banknote ejecting unit 16, this information is notified to the operator by the operation/display unit 54. In this way, the operation/display unit 54 functions as a notifying unit for informing the matter when at least one of the counterfeit note and suspect note is transported to the banknote ejecting unit 16. It should be noted that such a notifying unit is not limited to the operation/display unit 54.

A speaker or the like notifying the operator by sound may be used as the notifying unit, as long as it can notify the operator.

Note that the banknote handling apparatus 1 and the money handling system according to the present embodiment are not limited to the above-described aspects, and various modifications can be made.

For example, the money handling system according to the present embodiment is not limited to one having the banknote handling apparatus 1 and coin handling apparatus 101. As the money handling system according to the present embodiment, the banknote handling apparatus 1 may be used as a standalone type.

In the banknote handling apparatus 1 according to the present embodiment, as the storage unit, where at least one of a counterfeit note and suspect note among the banknotes transported by the transporting unit 12 is to be transported, the destination selector 52 can select two or more storage units among the plurality of storage units. In this case, it is possible to handle the banknotes even when many counterfeit notes or suspect notes are inserted into the banknote handling apparatus 1. Note that when sending a dispense reject banknote to one of the two banknote storage units 18, 19, the destination selector 52 cannot select the two banknote storage units 18, 19 as the storage unit where a counterfeit note or suspect note is to be transported.

In the above description, the principle of the present invention is applied to the banknote handling apparatus 1, but the principle of the present invention may be applied to the coin handling apparatus 101. That is, a transporting unit (not shown) configured to transport coins and a plurality of storage units (not shown) connected to different places in the transporting unit and storing coins sent from the transporting unit are respectively provided in the coin handling apparatus 101. In the case where at least one storage unit is configured so that the stored coins are not exposed to the outside, a storage unit, where at least one of a counterfeit coin and suspect coin among the coins transported by the transporting unit is to be transported, may be selected from a plurality of storage units by a destination selector (not shown). In this case, when deposit processing of coins is performed, the controller 180 controls the transporting unit to transport at least one of the counterfeit coin and suspect coin to the storage unit selected by the destination selector among the plurality of storage units. Further, when dispense processing of coins is performed, the controller 180 controls the transporting unit to transport the coin not to be dispensed (specifically, dispense reject coin) among the coins fed out from a storage/feeding unit (not shown) to a storage unit that is not selected by the destination selector among the plurality of storage units. Even in such a coin handling apparatus 101, similar to the banknote handling apparatus 1 described above, the storage unit, where at least one of a counterfeit coin and suspect coin among coins transported by the transporting unit is to be transported, is selected from a plurality of storage units by the destination selector in advance. Then, at least one of the counterfeit coin and suspect coin is transported to the selected storage unit. This makes it possible to perform flexible processing of coins according to the operation form as compared with the case where there is only one storage unit that can store the counterfeit coin or suspect coin sent from the transporting unit.

The invention claimed is:

1. A banknote handling apparatus, comprising:

an inlet through which at least one banknote is fed from outside of the banknote handling apparatus into inside of the banknote handling apparatus;

a transport to transport the at least one banknote;

an outlet through which a first banknote is fed out from inside of the banknote handling apparatus to outside of the banknote handling apparatus;

a plurality of storages, each storage of the plurality of storages storing banknotes;

a collection cassette which stores the banknotes fed from the plurality of storages;

an upper assembly including the inlet and the outlet; and a lower assembly below the upper assembly, the lower assembly including the plurality of storages and the collection cassette, wherein the transport includes a first transport in the upper assembly and a second transport in the lower assembly, the first transport connects the inlet and the outlet, the second transport connects the first transport and the plurality of storages, a first part of the second transport is positioned between a rear side of the lower assembly and the plurality of storages, the collection cassette is positioned between a front side of the lower assembly and the plurality of storages, a second part of the second transport is arranged in the lower assembly above the plurality of storages, the first part of the second transport extends along a first axis, the second part of the second transport extends along a second axis different from the first axis to connect to the collection cassette in the lower assembly, and the second transport connects the first transport and the collection cassette.

2. The banknote handling apparatus according to claim 1, wherein in a case that a deposit process is performed and a particular banknote is inserted through the inlet, the second transport transports the particular banknote to the collection cassette based on a recognition result, and the particular banknote is of a denomination not assigned to the plurality of storages.

3. The banknote handling apparatus according to claim 1, wherein the second transport transports a particular banknote fed out from the plurality of storages to the collection cassette in a collection process.

4. The banknote handling apparatus according to claim 1, wherein each storage of the plurality of storages includes a rotating member, and a particular banknote being transported to a respective storage is wound around the rotation member of the respective storage with a pair of tapes sandwiching the particular banknote there between.

5. The banknote handling apparatus according to claim 1, further comprising a shutter mechanism to open and close the outlet.

6. The banknote handling apparatus according to claim 1, wherein a part of the first transport horizontally transports the at least one banknote fed from outside through the inlet.

7. The banknote handling apparatus according to claim 1, wherein the second transport connects to a transport inlet located on a side of the collection cassette.

8. The banknote handling apparatus according to claim 7, wherein the second part of the second transport, which connects to the collection cassette, is positioned between the plurality of storages and a top of the lower assembly.

9. The banknote handling apparatus according to claim 8, wherein the second part of the second transport is the first part of the second transport.

10. The banknote handling apparatus according to claim 1, wherein the outlet is positioned below the inlet.

11. The banknote handling apparatus according to claim 10, further comprising a first detecting sensor which detects the at least one banknote in the transport having been fed from the inlet.

12. The banknote handling apparatus according to claim 1, further comprising:

a housing; and a touch panel which is an input interface, the touch panel positioned on an upper surface of the housing.

13. The banknote handling apparatus according to claim 1, wherein a length of the second part of the second transport is longer than a length of one of the storages.

14. The banknote handling apparatus according to claim 1, wherein the second axis is perpendicular to the first axis.

15. The banknote handling apparatus according to claim 1, wherein the second transport connects to the first transport at only one point.

16. The banknote handling apparatus according to claim 1, wherein the length of the second part of the second transport is shorter than a height of the collection cassette.

* * * * *